United States Patent [19]
Miyazaki

[11] Patent Number: 6,166,117
[45] Date of Patent: Dec. 26, 2000

[54] WATER-SOLUBLE FILM

[75] Inventor: Hirotoshi Miyazaki, Kurashiki, Japan

[73] Assignee: Kuraray Co., Ltd., Kurashiki, Japan

[21] Appl. No.: 09/094,506

[22] Filed: Jun. 10, 1998

[30] Foreign Application Priority Data

Jun. 11, 1997 [JP] Japan ................................ 9-153227
Dec. 3, 1997 [JP] Japan ................................ 9-332706

[51] Int. Cl.⁷ ........................................ C08K 5/09
[52] U.S. Cl. ........................ 524/291; 524/284; 525/58; 525/59; 525/61
[58] Field of Search ................... 524/291, 284; 525/58, 59, 61

[56] References Cited

U.S. PATENT DOCUMENTS

| | | | |
|---|---|---|---|
| 4,156,047 | 5/1979 | Wysong . | |
| 4,221,710 | 9/1980 | Hoshi et al. | 252/316 |
| 4,753,947 | 6/1988 | Dorn et al. | 514/277 |
| 4,833,116 | 5/1989 | Yamori et al. | 503/200 |
| 4,910,185 | 3/1990 | Satake et al. | 503/210 |
| 4,954,477 | 9/1990 | Shuku et al. | 503/226 |
| 5,677,365 | 10/1997 | Kikuta et al. | 523/201 |

FOREIGN PATENT DOCUMENTS

| | | |
|---|---|---|
| 0 259 037 | 3/1988 | European Pat. Off. . |
| 53-24351 | 3/1978 | Japan . |
| 7-118407 | 5/1995 | Japan . |
| 9-316270 | 12/1997 | Japan . |

OTHER PUBLICATIONS

Patent Abstracts of Japan, vol. 095, No. 008, Sep. 29, 1995, JP 07 118 407, May 9, 1995.

*Primary Examiner*—Judy M. Reddick
*Attorney, Agent, or Firm*—Oblon, Spivak, McClelland, Maier & Neustadt, P.C.

[57] ABSTRACT

A water-soluble film, comprising 100 parts by weight of (A) a sulfonic acid group modified polyvinyl alcohol and 0.05–20 parts by weight of (B) gallic acid, salts thereof or a $C_{1-5}$ alkyl ester thereof.

12 Claims, No Drawings

WATER-SOLUBLE FILM

BACKGROUND OF THE INVENTION

1. Field of the Invention

The present invention relates to a polyvinyl alcohol (hereinafter referred to as PVA) film having excellent properties which make it suitable for use in the packaging of chemicals such as agricultural chemicals, microbiocides, and the like.

2. Description of the Background

A method of unit-dose packaging (unit pack) various chemicals such as agricultural chemicals under airtight packaging conditions in a water-soluble film has been recently employed, where the chemicals in packaged form are thrown into water so that the contents are dissolved or dispersed in water. The unit pack is advantageous in that users do not directly touch harmful chemicals, the measurement of chemicals for use in unnecessary as the unit-dose is already packaged, and the disposal of the containers and bags used for packaging chemicals is unnecessary or is easy.

Partially-hydrolyzed PVA films have been used in the past as water-soluble films for a unit pack. The conventional water-soluble films exhibit excellent cold water-solubility and mechanical strength. However, some types of chemicals, which are packaged in these films, cause problems by lowering the water-solubility of the films with the passage fo time during storage to the point that the films finally become water-insoluble or hardly soluble in water.

Chemicals which cause partially-hydrolyzed PVA films to become water-insoluble include, for example, alkali chemical substances, acid chemical substances, chlorine-containing chemical substances, chemical compounds of a salt of a polyvalent metal such as copper, cobalt, or the like, polycarboxylic acid containing chemical substances, polyamine-containing chemical substances, boric acid-containing chemical substances, agricultural chemicals such as insecticides, herbicides, and the like, and microbiocides.

Films for packaging alkali chemical substances which are known include films of PVA modified with salts of carboxylic acids. A film which is resistant to boric acid is a sorbitol-containing PVA film.

Known films for packaging acid chemical substances, chlorine-containing chemical substances (microbiocides, etc.) and agricultural chemicals include films fo polyethylene oxide and cellulose, However these films are defective in that their water-solubility is extremely low, their mechanical properties are poor, and their impact resistance at low temperatures is extremely low because they are hard and brittle.

Films which are known for packaging agricultural chemicals and microbiocides include water-soluble films that are prepared from PVA or carboxylate-modified PVA, wherein the polymer is combined with an auxiliary such as polyethylene glycol or propyl gallate. (See Japanese Patent Application Laid-Open No. Sho-53-24351 (1978).) Also water-soluble films for packaging agricultural chemicals are known, which are prepared from sodium 2-acrylamido-2-methylpropanesulfonate-modified PVA having added thereto a phenol derivative such as bisphenol A. (See JP Hei-7-118407 (1995).) However, in the event chemicals such as acid chemical substances, chlorine-containing chemical substances, agricultural chemicals and microbiocides are packaged in the conventional PVA films and stored for a long period, the PVA films lose their function as a water-soluble film, because they become discolored (a brown color) and become insoluble in cold water and hot water. A need continues to exist for a PVA based packaging film which is resistant to various chemical materials which are stored therein.

SUMMARY OF THE INVENTION

Accordingly, one object of the present invention is to provide a water-soluble film which has excellent mechanical strength, which has softness and toughness, and moreover which can maintain its original water-solubility when such chemicals as agricultural chemicals and microbiocides are packaged therein and stored for long periods of time.

Another object of the present invention is to provide a package for acidic chemical substances, chlorine-containing chemical substances and agricultural chemicals which is formed of a water-soluble film.

Still another object of the present invention is to provide a composition which can favorably be used as a material for the production of water-soluble films.

Briefly, these objects and other objects of the present invention as hereinafter will become more readily apparent can be attained by a water-soluble film comprising 100 parts by weight of (A) a sulfonic acid group modified polyvinyl alcohol and 0.05–20 parts by weight of (B) gallic acid, salts thereof or a $C_{1-5}$ alkyl ester thereof.

Another aspect of the invention is directed to a composition for the film which is as defined above.

DETAILED DESCRIPTION OF THE PREFERRED EMBODIMENTS

The sulfonic acid group modified PVA (A) of the present invention is, for example, a hydrolyzate of a copolymer prepared from a vinyl ester and a sulfonic acid group containing monomer, or can be a polymer which is prepared by the addition of a sulfonic acid group-containing compound to PVA hydrolyzak of polyvinyl ester).

The hydrolyzate of a copolymer of a vinyl ester and a sulfonic acid group-containing monomer is obtained by copolymerizing, in the presence of a radical initiator, a vinyl ester and a sulfonic acid group-containing monomer in bulk or in a solvent such as an alcohol, followed by partially or extensively hydrolyzing the copolymer with an alkali or acid catalyst. Suitable vinyl esters include, for example, vinyl acetate, vinyl propionate, vinyl formate, vinyl versate, vinyl pivalate, and the like. Of these monomers, vinyl acetate is preferred, because it is produced on an industrial scale and is favorable from the aspect of cost.

Any sulfonic acid group-containing monomer can be used insofar as it has a sulfonic acid group or a salt thereof in the molecule and is copolymerizable with a vinyl ester. Suitable examples include 2-acrylamido-2-methylpropanesulfonic acid, 2-acrylamido-1-methylpropanesulfonic acid, 2-methacrylamido-2-methylpropanesulfonic acid, and alkali metal salts thereof; olefin sulfonic acids such as ethylensulfonic acid, allylsulfonic, acid, methallylsulfonic acid, and alkali metal salts thereof. Of these, most preferred are 2-acrylamido-2-methylpropanesulfonic acid and alkali metal salts thereof, because of their copolymerizability with vinyl esters and their stability during hydrolysis. Suitable alkali metals include Na, K, Li, and the like. Also within the scope of the invention are sulfonic acid salts of ammonia, amines, and the like. The sulfonic acid group in acid form is an embodiment of the invention. However, preferably the group is partially or completely neutralized with an alkali metal in order to prevent the vinyl ester from being hydrolyzed during copolymerization.

The copolymer of the vinyl ester and the sulfonic acid group-containing monomer is then hydrolyzed with an alkali or acid catalyst in an alcohol solution to give the modified PVA containing sulfonic acid groups.

The polymer which is prepared by the addition of a sulfonic acid group-containing compound to PVA hydrolyzate of polyvinyl ester) is a polymer which is prepared by introduction of a sulfonic acid group-containing compound into PVA by acetalization or by a Michael addition reaction.

For the introduction of the sulfonic acid group containing compound into the polymer by acetalization, the aldehyde compound employed has a sulfonic acid group such as a salt of butylaldehydosulfonic acid or a salt of benzaldehydosulfonic acid.

The sulfonic acid group-containing compound which is employed as a reactant in the Michael addition reaction is an unsaturated sulfonic acid group-containing compound such as 2-acrylamido-2-methylpropanesulfonic acid, allylsulfonic acid, or alkali metal salts thereof.

Other than the above methods, a suitable method is the addition of a sulfonic acid group-containing alcohol compound to PVA by electrification. Still another reaction is the introduction of a sulfonic acid group-containing halide compound into PVA by a condensation reaction.

The content of sulfonic acid group unit in the modified PVA (A) preferably ranges from 0.1–20 mol. %. more preferably from 0.5–10mol. %, most preferably from 1–5 mol. %.

The mechanical properties of the water-soluble film are also important, and strength and flexibility of the film are necessary even in the case of a thin thickness of 10–100 μm. Therefore, the viscosity-average degree fo polymerization (hereinafter referred to a degree of polymerization) of the modified PVA (A) is preferably 300–10000, more preferably 500–8000. In the case where the degree fo polymerization is less than 300, the film strength is less. In the case where the degree fo polymerization is more than 10000, the viscosity of the solution during preparation of the film is so high that the workability is lessened.

Since the film has to be water-soluble and resistant to chemicals, the degree of hydrolysis of the modified PVA (A) is 50–100 mol. %, preferably 80–100 mol. %. Such a degree of hydrolysis is also required in view of the strength and toughness requirements of the film and the workability of the into bags.

The gallic acid or $C_{1-5}$ alkyl ester thereof (B), which is a component of the present invention film, is a compound whose function is to prevent the water-soluble film from becoming water-insoluble. Suitable examples include gallic acid, its salts, and its esters such as methyl, ethyl, propyl, isoamyl, and the like. If these compounds, the most preferred are gallic acid and propyl gallate (propyl ester of gallic acid).

The amount of component (B) in the film ranges from 0.05–20 parts by weight, preferably 0.2–10 parts by weight, more preferably 0.5–3 parts by weight, based on 100 parts by weight of component (A). In the event where the amount of component (B) is less than 0.05 parts by weight, the water-solubility of the film is decreased and the film becomes water-insoluble when chemicals are packaged in the film and stored. On the other hand, in the case where the amount of component (B) is more than 20 parts by weight, the film strength is substantially decreased and, in addition, white powder migrates onto the surface of the film.

In addition to components (A) and (B) of the film, loading of the water-soluble film of the present invention with a reducing hydroxycarboxylic acid (C) can improve the films stability during storage and furthermore prevent discoloration because of the presence of a polyvalent metal ion such as iron ion.

Suitable reducing hydroxycarboxylic acids. (C) include, for example, citric acid, tartaric acid, L-ascorbic acid, malic acid, racemic acid, and salts thereof. Of these, citric acid, tartaric acid and L-ascorbic acid are preferred. Particularly preferred is citric acid. The amount of the component (C) preferably ranges from 0.01–10 parts by weight, more preferably form 0.05–5 parts by weight, most preferably 0.1–3 parts by weight, based on 100 parts by weight of PVA (A).

Since the water-soluble film of the present invention is transported, stored and used even in high-temperature and high-humidity districts and cold-temperature districts, the strength and toughness of the film are important and essential characteristics. In particular, it is necessary for the film to have good impact resistance at low temperature, and therefore various plasticizers can be added for the purpose of lowering the glass transition temperature of the film. Suitable examples include polyalcohols such as glycerin, diglycerin, diethylene glycol, and the like; polyethers such as polyethylene glycol, polypropylene glycol, and the like; phenol derivatives such as bisphenol A, bisphenol S, and the like; amide compounds such as N-methylpyrrolidone, and the like; phenol derivatives such as as glycerin, pentaerythritol, sorbitol, and the like with ethylene oxide; water, and the like. These plasticizers can be used alone or in combination.

Method of producing the film include, for example, a method in which component (B) and optionally component (C) are added to an aqueous solution of the modified PVA (A), followed by dissolving or dispersing these materials, and thereafter casting the solution or dispersion onto a film. Another method is to melt-extrude the materials in the presence of a suitable plasticizer or water into a film. If desired, one or more ordinary additives such as colorants, fragrances, vehicles, defoaming agents, mod-release agents, ultraviolet absorbents, inorganic powders, surfactants, preservatives, antifungal agents and the like, may be added. Further if desired, a water-soluble polymer such as PVA other than component (A), starch, carboxymethyl cellulose, methyl cellulose, hydroxymethyl cellulose and the like, may also be added thereto within a range which does not impair the characteristics of the film of the present invention.

As the chemicals which are packaged in the water-soluble film of the present invention, preferred are acid chemical substances, chlorine-containing chemical substances, agricultural chemicals, microbiocides, and the like. Other chemicals such as detergents, dyes, chemical substances for plantation and cultivation, and the like can be packaged.

The acid chemical substances are those which are acidic when dissolved or dispersed in water. Suitable example include agricultural chemicals, microbiocides, deodorizers, and the like.

Chlorine-containing chemical substances are those which contain chlorine in the molecule, Suitable examples include agricultural chemicals, microbiocides, bleaches, and the like. Specific examples include isocyanuric acid trichloride, isocyanuric acid dichloride, the sodium salt of isocyanuric acid dichloride, N,N-dichlorohydantoin, N-chloro-N-bromo-5,5-dimethylhydantoin, and the like.

Agricultural chemicals include chloropicrin, 1,3-dichloropropene, dichloroisopropyl ether, and the like.

The chemicals may be in any form such as granular, tabletted, powdered or even liquid. They may be combined with a carrier such as talc, kaolin, bentonite, diatomaceous earth, or the like; and extender; a surfactant and a dispersant to improve the affinity of the chemicals for water and to uniformly disperse the chemicals in water.

The water-soluble film of the present invention provides excellent advantages because its water-solubility does not diminish with the passage of time, even when the film is used for the packaging of acidic chemical substances, chlorine-containing chemical substances or agricultural chemicals.

The present invention also provides a composition comprising 100 parts by weight of component (A) and 0.05–20 parts by weight of component (B). It further provides a composition comprising 100 parts by weight of component (A) 0.05–20 parts by weight of component (B), and 0.01–10 parts by weight of component (C). These compositions are advantageously used, not only as a material for producing the above-mentioned water-soluble film, but also as a material for producing fiber which is used in non-woven fabrics, and the like.

Having now generally described the invention, a further understanding can be obtained by reference to certain specific examples which are provided herein for purpose of illustration only and are not intended to be limiting unless otherwise specified. Unless otherwise specifically indicated, "%" and "part(s)" in the Examples are on weight-basis.

EXAMPLE 1

A methanol solution of sodium hydroxide was added to a methanol solution of a copolymer which had been prepared by copolymerizing, in methanol, vinyl acetate and sodium acrylamido-2-methylpropanesulfonate, thereby hydrolyzing the copolymer to give a modified PVA having a sulfonic acid group. The modified PVA thus obtained had a degree of polymerization of 1700, a degree of hydrolysis of 88 mol. %, and a sulfonic acid group content of 2 mol. %.

To 100 parts of the modified PVA, were added 1 part of propyl gallate, 0.2 parts of citric acid, and 20 parts of glycerin as a plasticizer to prepare a uniform aqueous solution. The solution was cast onto a hot roll at 70° C. to prepare a modified PVA film having a thickness of 40 µm.

This modified PVA film was formed into bags (10×15 cm). A 35 g amount of tablets of a microbiocides for swimming pools, which contained trichloroisocyanuric acid as the main component, was placed into each bag, and hot-sealed. Packages were thus obtained (single-wrapped packages) having the chemicals therein. The outsides of the prepared packages were furthermore wrapped with a film which was obtained by laminating the surface of aluminium with polyethylene (hereinafter referred to as aluminium-laminated film), and hot-sealed to give double-wrapped packages.

The double-wrapped packages having the chemical therein were subjected to an accelerating test (shelf test) for long-term storage stability, in which the packages were left in a thermostatic chamber at 40° C. for 3 months. After storage, the packages were evaluated for changes in the water-solubility of the PVA film, the degree of discoloration of the PVA film, and the odor from single-wrapped packages after the aluminium-laminated film had been removed from the double-wrapped packages. The methods of each test are shown below. The evaluation results are shown in Table 1.

Method of Measuring Water-solubility of PVA Film

The PVA film was cut into squares (40 mm×40 mm). Each piece was framed, and dipped in water which was stirred at 20° C. or 10° C. the time (in seconds) was measured until the PVA film completely dissolved, In the event the PVA film did not dissolve within 30 minutes, it was evaluated as being water-insoluble.

Discoloration of PVA Film

The results obtained were rated in terms of the following symbols

○: Not discolored, which means colorless.

Δ: Slightly yellowed.

X: Browned.

Smell from Single-Wrapped Package

The odors of the films were sensually evaluated from single-wrapped packages after the aluminum-laminated film had been removed from each double-wrapped package. The results obtained were rated in terms of the following symbols:

○: No odor.

Δ: A little odor.

X: Very strong odor.

EXAMPLE 2

In the same manner as described in Example 1, vinyl acetate and sodium acrylamido-2-methylpropanesulfonate were copolymerized and hydrolyzed to prepare a modified PVA having sulfonic acid groups. The modified PVA had a degree of polymerization of 1250, a degree of hydrolysis of 97 mol. %, and a sulfonic acid group content of 4 mol. %.

A modified PVA film having a thickness of 40 µm was formed in the same manner as described in Example, 1, except that 1 part of propyl gallate, and 0.5 parts of citric acid, and 10 parts of glycerin and 15 parts of diglycerin, as plasticizers, were added to 100 parts of the modified PVA.

In the same manner as described in Example 1, except that 35 g of tablets of a microbiocidal detergent for toilets (sodium dichloroisocyanurate containing a surfactant) was packaged with the modified PVA film prepared herein , double-wrapped packages were prepared and evaluated. The results are shown in Table 1.

EXAMPLE 3

In the same manner as described in Example, 1, vinyl acetate and sodium acrylamido-2-methylpropanesulfonate were copolymerized and hydrolyzed to prepare a modified PVA containing sulfonic acid groups. The modified PVA had a degree of polymerization of 1250, a degree of hyudrolysis of 98 mol. %, and a sulfonic acid group content of 4 mol. %.

A modified PVA film having a thickness of 40 µm was prepared in the same manner as described in Example 1, except that 0.8 parts of ethyl gallate, 0.3 parts of L-ascorbic acid, and 15 parts of glycerin and 10 parts of polyethylene glycol #300 as plasticizers were added to 100 parts of the modified PVA.

In the same manner as described in Example 1, except that a microbiocides containing bromo, chloro-5,5-dimethylhydantoin was packaged in the modified PVA film prepared herein, double-wrapped packages were prepared and evaluated. The results are shown in Table 1.

EXAMPLE 4

A modified PVA film having a thickness of 40 µm was prepared in the same manner as described in Example 3, except that L-ascorbic acid was not added.

In the same manner as described in Example 3, except that a microbiocide containing bromo, chloro-5,5- dimethylhydantoin was packaged in the modified PVA film prepared herein, double-wrapped packages were prepared and evaluated. The results are shown in Table 1.

EXAMPLE 5

To an aqueous solution of PVA having a degree of polymerization of 1700 and a degree of hydrolysis of 99.6 mol. % (This solution was made acidic with hydrochloric acid.), was added 5 mol. % (based on the amount of vinyl alcohol units in the PVA) of sulfonic acid benzaldehyde, whereby sulfonic acid benzaldehyde was added to the PVA by an acetalization reaction. A modified PVA containing sulfonic acid groups was obtained.

A modified PVA film having a thickness of 40 μm was formed in the same manner as described in Example 1, except that 2.5 parts of gallic acid, 1 part of tartaric acid, and 10 parts of glycerin and 15 parts of diglycerin, as plasticizers, were added to 100 parts of the modified PVA.

In the same manner as describe in Example 1, except that a microbiocide for swimming pools was packaged in the modified PVA film prepared herein, double-wrapped packages were prepared and evaluated. The results are shown in Table 1.

COMPARATIVE EXAMPLE 1

A modified PVA film having a thickness of 40 μm was prepared in the same manner as described in Example 1, except that propyl gallate and citric acid were not added.

In the same manner as described in Example 1, except that a microbiocide for swimming pools was packaged in the modified PVA film prepared herein, double-wrapped packages were prepared and evaluated. The results are shown in Table 1.

COMPARATIVE EXAMPLE 2

A modified PVA film having a thickness of 40 μm was prepared in the same manner as described in Example 2, except that propyl gallate was not added.

In the same manner as described in Example 2, except that a microbiocidal detergent for toilets was packaged in the modified PVA film prepared herein, double-wrapped packages were prepared and evaluated. The results are shown in Table 1.

COMPARATIVE EXAMPLE 3

A non-modified PVA film having a thickness of 40 μm was prepared in the same manner as described in Example 1, except that a non-modified PVA having a degree fo polymerization of 700 and a degree of hydrolysis of 88 mol. % was used instead of the modified PVA containing sulfonic acid groups.

In the same manner as described in Example 1, except that a mocrobiocide for swimming pools was packaged in the non-modified PVA film prepared herein, double-wrapped packages were prepared and evaluated. The results are shown in Table 1.

COMPARATIVE EXAMPLE 4

A modified PVA film having a thickness of 40 μm was prepared in the same manner as described in Example 1, except that 7 parts of bisphenol A was added instead of propyl gallate.

In the same manner as described in Example 1, except that a mocrobiocide for swimming pools was packaged in the modified PVA film prepared herein, double-wrapped packages were prepared and evaluated. The results are shown in Table 1.

TABLE 1

|  | Before Shelf Test Water-solubility of PVA Film[1] | | After Shelf Test at 40° C. for 3 Months | | | |
|---|---|---|---|---|---|---|
|  | | | Water-solubility of PVA Film[1] | | Discoloration of PVA Film[2] | Odor from Single-Wrapped Packages[3] |
|  | 20° C. | 10° C. | 20° C. | 10° C. | | |
| Example 1 | 19 | 28 | 35 | 58 | ◯ | ◯ |
| Example 2 | 14 | 23 | 20 | 27 | ◯ | ◯ |
| Example 3 | 15 | 25 | 28 | 36 | ◯ | ◯ |
| Example 4 | 22 | 35 | 130 | 158 | Δ | ◯ |
| Example 5 | 21 | 35 | 34 | 46 | ◯ | ◯ |
| Comparative Example 1 | 22 | 33 | water-insoluble | water-insoluble | X | X |
| Comparative Example 2 | 18 | 36 | water-insoluble | water-insoluble | X | Δ |
| Comparative Example 3 | 30 | 68 | water-insoluble | water-insoluble | X | X |
| Comparative Example 4 | 20 | 31 | water-insoluble | water-insoluble | X | X |

The notes for Table 1 are defined as follows.
[1]Water-solubility of PVA Film: Time (seconds) was measured until the PVA film completely dissolved.
[2]Discoloration of PVA Film:
◯: Not discolored, which means colorless.
Δ: Slightly yellowed.
X: Browned.
[3]Odor from single-Package:
◯: No odor
Δ: A little odor
X: Very strong odor The disclosures of Japanese priority applications serial numbers 153227/97 and 332706/97 filed Jun. 11, 1997 and Dec. 3, 1997 are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A water-soluble film, comprising:
   100 parts by weight of (A) a sulfonic acid group modified polyvinyl alcohol and 0.50–20 parts by weight of (B) gallic acid, its salts or a $C_{1-5}$ alkyl ester thereof.

2. The water-soluble film of claim 1, wherein said gallic acid ester is the methyl, ethyl, propyl or isoamyl ester.

3. The water-soluble film of claim 1, wherein the amount of gallic acid or a $C_{1-5}$-alkyl ester thereof ranges form 0.2–10 parts by weight.

4. The water-soluble film of claim 1, wherein the content of the sulfonic acid group unit in the polyvinyl alcohol ranges form 0.1–20 mol. %.

5. The water-soluble film of claim 4, wherein the content of the sulfonic acid group unit ranges from 0.5–10 mol. %.

6. The water-soluble film of claim 1, wherein the polyvinyl alcohol is prepared from a sulfonic acid group containing monomer selected from the group consisting of 2-acrylamido-2-methylpropanesulfonic acid, 2-methacrylamido-2-methylpropanesulfonic acid, salts thereof and olefin sulfonic acids.

7. The water-soluble film of claim 1, wherein the degree of hydrolysis of the polyvinyl alcohol ranges form 50–100 mol. %.

8. The water-soluble film of claim 7, wherein said degree of hydrolysis ranges from 80–100 mol. %.

9. The water-soluble film of claim 1, wherein the sulfonic acid group modified polyvinyl alcohol is prepared by the copolymerization of a vinyl ester a sulfonic acid group containing a monomer.

10. The water-soluble film of claim 9, wherein the polyvinyl alcohol is prepared by the reaction of a sulfonic acid containing compound with polyvinyl alcohol.

11. The water-soluble film of claim 1, wherein the polyvinyl alcohol is prepared by the reaction of a sulfonic acid containing compound with polyvinyl alcohol.

12. A composition, comprising:
   100 parts by weight of (A) a sulfonic acid group modified polyvinyl alcohol and 0.05–20 parts by weight of (B) gallic acid, salts thereof or a $C_{1-5}$ alkyl ester thereof.

* * * * *